Oct. 24, 1939.                J. L. FLETCHER                2,177,522
                FOOD STORAGE RECEPTACLE FOR REFRIGERATORS
                     Filed July 9, 1937          2 Sheets-Sheet 2
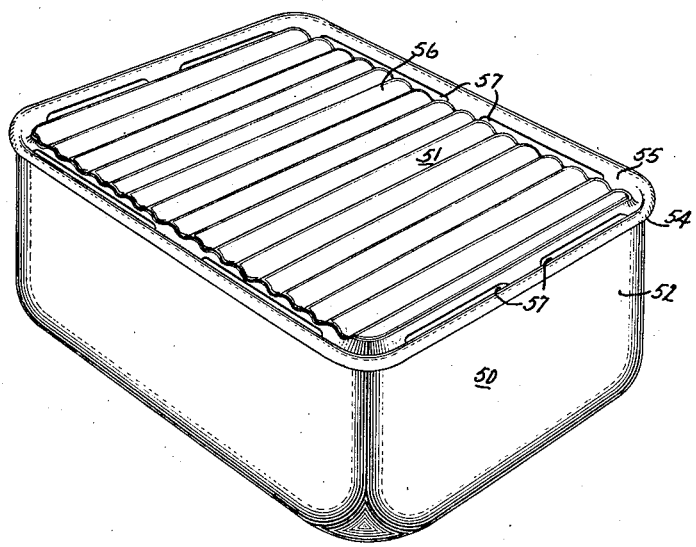
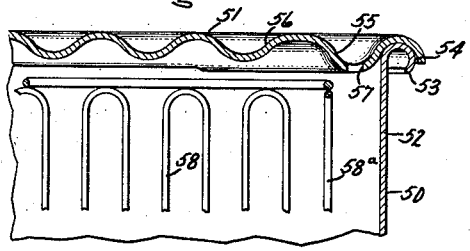
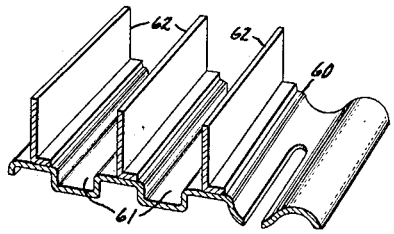
Inventor:
James L. Fletcher,
by Harry E. Dunham
His Attorney.

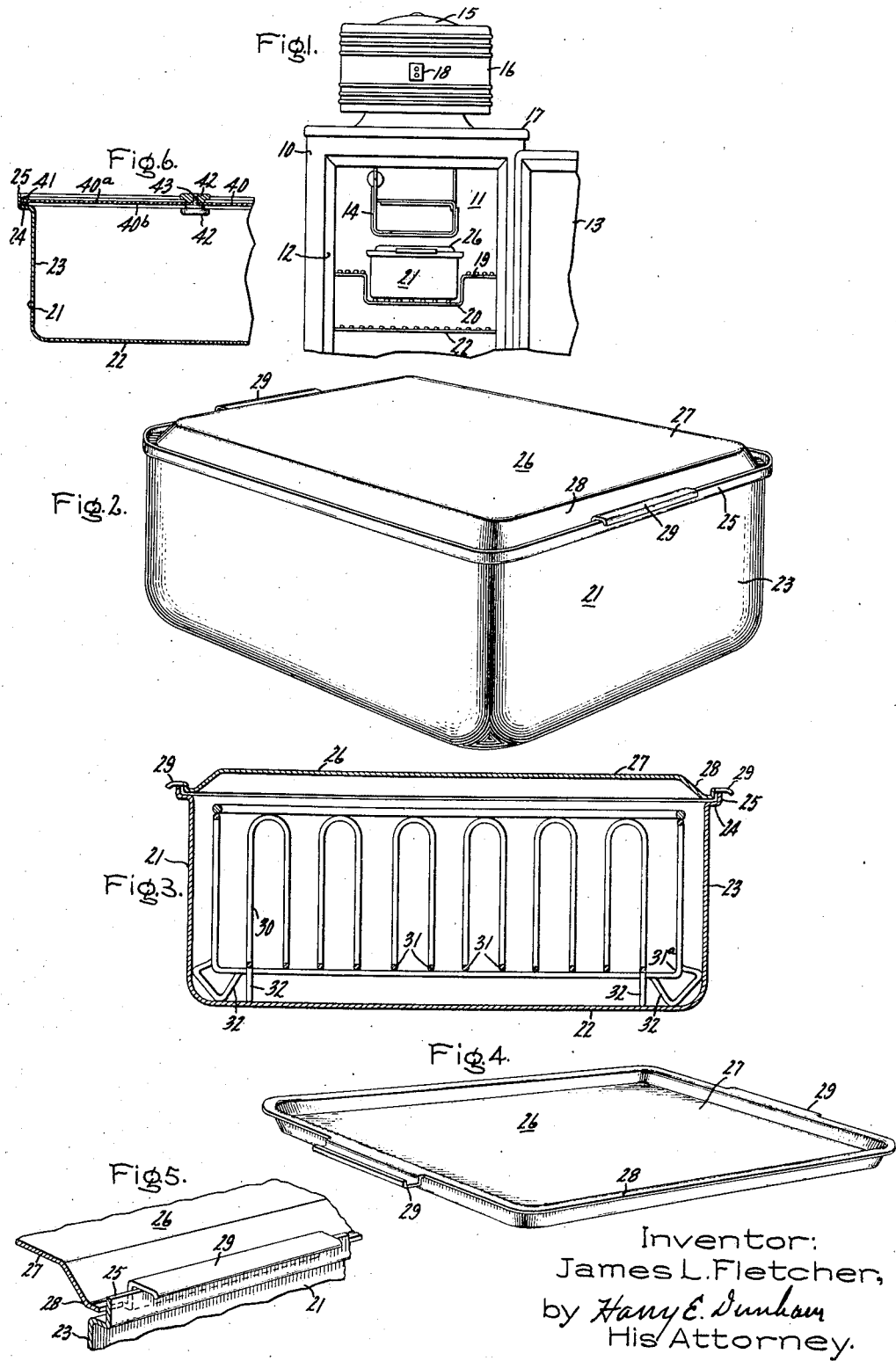
Oct. 24, 1939.  J. L. FLETCHER  2,177,522
FOOD STORAGE RECEPTACLE FOR REFRIGERATORS
Filed July 9, 1937  2 Sheets-Sheet 1
Inventor:
James L. Fletcher,
by Harry E. Dunham
His Attorney.

Patented Oct. 24, 1939

2,177,522

UNITED STATES PATENT OFFICE 2,177,522

FOOD STORAGE RECEPTACLE FOR REFRIGERATORS

James L. Fletcher, Schenectady, N. Y., assignor to General Electric Company, a corporation of New York Application July 9, 1937, Serial No. 152,792

18 Claims. (Cl. 62—103)

My invention relates to refrigerators, and more particularly to food storage receptacles associated with the refrigerated compartments of refrigerators for storing ice cubes and for preserving fruits, green vegetables, meats and the like.

The air in a refrigerated compartment of a household refrigerator is usually maintained at an average temperature between 40° F. and 45° F. for general refrigeration purposes. An average temperature within this range may be maintained in the refrigerated compartment by the convection currents of air set up therein by a cooling unit or refrigerant evaporator located in the upper portion of the refrigerated compartment. In the usual refrigerator this result is obtained by maintaining the temperature of the surface of the evaporator considerably below 32° F., for example, approximately 20° F. While a storage atmosphere having a temperature within the range mentioned is satisfactory for the preservation of foods in general, certain types of foods such, for example, as meats and fish may be more satisfactorily preserved in a storage atmosphere having a lower temperature range. A storage atmosphere having a temperature range between 30° F. and 34° F. is more suitable for the preservation of meats and fish. Moreover, these foods are better preserved in a storage atmosphere having a higher relative humidity than the air circulated in the refrigerated compartment of the usual refrigerator.

It is an object of my invention to provide an improved construction and arrangement of a food storage receptacle in the refrigerated compartment of a refrigerator which is adapted to maintain a storage atmosphere therein having a lower temperature than the air circulated in the refrigerated compartment.

Another object of my invention is to provide a food storage receptacle for the refrigerated compartments of refrigerators having walls for impeding heat transfer thereto by radiant heat from the walls of the refrigerated compartments or bodies therein and a wall closely adjacent a cooling unit disposed in the refrigerated compartment for promoting heat transfer therefrom by radiant heat to the cooling unit.

A further object of my invention is to provide an improved construction and arrangement of a food storage receptacle in the refrigerated compartment of a refrigerator for receiving drip water from a cooling unit arranged within the refrigerated compartment incident to defrosting of the cooling unit.

Another object of my invention is to provide a food storage receptacle for refrigerators having a removable cover of improved construction which is adapted to be inverted for use as a serving tray.

A further object of my invention is to provide a food storage receptacle for refrigerators having an improved arrangement including an invertible cover for selectively controlling the temperature of the interior of the receptacle.

Another object of my invention is to provide a food storage receptacle for the refrigerated compartments of refrigerators having a removable cover embodying an improved arrangement for increasing the effective area of the cover to provide an increased heat transfer by convection currents of air from the cover to a cooling unit disposed in the refrigerated compartment.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawings in which Fig. 1 is a fragmentary front elevational view of a household refrigerator having a refrigerated compartment provided with a food storage receptacle embodying my invention; Fig. 2 is an enlarged perspective view of the food storage receptacle shown in Fig. 1; Fig. 3 is a longitudinal sectional view of the food storage receptacle, a removable cover therefor, and a rack arranged within the receptacle for supporting food above the bottom wall of the receptacle; Fig. 4 is a perspective view of the removable cover showing it in an inverted position for use as a serving tray; Fig. 5 is a fragmentary perspective view, partly in section, of the upper portion of a marginal wall of the food storage receptacle and a handle provided on the end of the removable cover for supporting the cover in place on the receptacle; Fig. 6 is a reduced fragmentary longitudinal sectional view of the food storage receptacle shown in Figs. 2 and 3 and a modified form of cover therefor; Fig. 7 is a perspective view of a modified form of the food storage receptacle and a further modified form of the removable cover therefor; Fig. 8 is a fragmentary longitudinal sectional view of the food storage receptacle and the removable cover shown in Fig. 7; and Fig. 9 is a fragmentary perspective view of a modified form of the removable cover shown in Figs. 7 and 8.

Referring to the drawings, in Fig. 1 I have shown a household refrigerator 10 provided with heat insulated walls defining a refrigerated compartment 11 having an opening 12 in the front wall thereof and a heat insulated door 13 for the opening 12. The refrigerator is cooled by a refrigerating machine including a cooling unit or refrigerant evaporator 14 arranged in the upper portion of the refrigerated compartment 11, a motor driven compressor enclosed in a casing 15, and an air cooled condenser 16. The refrigerating machine constitutes a unitary construction supported upon a removable top wall 17 of the refrigerator to facilitate assembly of the refrigerator. The refrigerating machine is provided with a suitable thermal control arrangement which includes a thermal element in contact with the evaporator 14 and a temperature adjusting device 18 mounted on the condenser 16 for maintaining various average temperatures of the evaporator 14 to obtain a predetermined range of temperatures of the air within the refrigerated compartment 11. A shelf 19 is supported on the side walls of the refrigerated compartment 11 and is provided with a downwardly extending offset portion 20 disposed below the refrigerant evaporator 14 for supporting a food storage receptacle 21 below the refrigerant evaporator 14 and closely adjacent thereto. Other spaced-apart shelves 22 are supported on the side walls of the refrigerated compartment 11 below the shelf 19. The shelves 19 and 22 are preferably of open wire work construction so as not to interfere with the circulating convection currents of air set up by the refrigerant evaporator 14 in the refrigerated compartment 11.

As best shown in Figs. 2 and 3, the food storage receptacle 21 is of rectangular form in horizontal section and comprises a substantially flat bottom wall 22 and an upwardly directed marginal wall 23. An outwardly extending flange 24 is provided on the marginal wall 23 about the upper portion thereof and an upwardly extending flange 25 is disposed about the outer margin of the outwardly extending flange 24. A removable cover 26 having a substantially flat surface 27 and a downwardly directed marginal rim 28 is supported upon the open top of the receptacle 21 with the marginal rim 28 of the cover 26 arranged within the upwardly extending flange 25 and spaced a short distance from the outwardly extending flange 24 and the upwardly extending flange 25 on the receptacle 21. The arrangement for supporting the cover 26 includes a pair of handles 29 carried on opposite ends of the cover and engaging the upper edge of the upwardly extending flange 25 disposed about the upwardly directed marginal wall 23 of the receptacle 21 as more clearly shown in Fig. 5. The handles 29 also facilitate placement and removal of the cover 26 upon the receptacle 21.

As best shown in Fig. 4, the removable cover 26 can be very conveniently employed as a serving tray when it is inverted due to the provision of the substantially flat surface 27 and the marginal rim 28 disposed thereabout. Thus, the handles 29 facilitate carrying the cover 26 when it is employed in an inverted position as a serving tray, in addition to supporting the cover 26 upon the open top of the receptacle 21.

A reticulated rack 30, preferably made of wire, is arranged within the receptacle 21 having food supporting cross wires 31 which provide a food supporting surface spaced above the bottom wall 22 of the receptacle 21, the food supporting wires 31 being spaced inwardly on all sides of the rack from the marginal wall 23 of the receptacle 21, as indicated at 31a. The rack 30 is retained in place within the receptacle 21 by a plurality of supporting feet 32 which engage both the bottom wall 22 and the marginal wall 23 of the receptacle 21.

The receptacle 21 together with its removable cover 26 supported in place on the open top thereof is positioned in the refrigerated compartment 11 of the refrigerator 10 below and closely adjacent the refrigerant evaporator 14. Upon defrosting of the refrigerant evaporator 14 drip water therefrom falls upon the cover 26 and is directed thereby onto the outwardly extending flange 24 provided adjacent the upper portion of the marginal wall 23 of the receptacle 21. The drip water then flows between the marginal rim 28 of the cover 26 and the outwardly extending flange 24 into the interior of the receptacle 21 and downwardly over the inner surface of the marginal wall 23 onto the bottom wall 22 of the receptacle 21 where it is accumulated below the food supporting surface 31 of the rack 30 and out of contact with the food supported thereby. Due to the spacing of the food supporting wires 31 of the rack 30 above the bottom wall 22, and the spacing of the margin of the food supporting wires 31 of the rack 30 inwardly from the marginal wall 23 of the receptacle 21, the drip water from the refrigerant evaporator 14 which is directed by the cover 26 into the interior of the receptacle 21 does not normally come in contact with the food supported by the supporting wires 31 of the rack 30 and no contamination of the food results from defrosting of the refrigerant evaporator 14. Also, the spacing of the food supporting wires 31 of the rack 30 above the bottom wall 22 of the receptacle is coordinated with respect to the area of the bottom wall 22 to define a zone in the receptacle 21 disposed below the food supporting surface 31 of the rack 30 which has a volume greater than the volume of the drip water from the refrigerant evaporator 14 incident to defrosting of the refrigerant evaporator 14.

In the refrigerator 10 the air in the refrigerated compartment 11 is maintained at a temperature of approximately 40° F. by circulating currents of air set up in the refrigerated compartment 11 by the refrigerant evaporator 14. This is obtained by maintaining the temperature of the surface of the refrigerant evaporator 14 considerably below 32° F., for example, approximately 20° F. I have found that a storage atmosphere can be maintained in the interior of the receptacle 21 which has a temperature considerably below 40° F. even though the temperature of the exterior surface of the evaporator 14 is maintained at only approximately 20° F. by minimizing the heat transfer from the walls of the refrigerated compartment 11 and other bodies therein to the receptacle 21, and by increasing the heat transfer from the cover 26 of the receptacle 21 to the evaporator 14. This is accomplished by providing the receptacle 21 with an exterior surface having a relatively high coefficient of reflection of radiant heat and, consequently, a relatively low coefficient of absorption of radiant heat in order to impede heat transfer from other bodies in the refrigerated compartment 11 to the receptacle 21, and by providing the cover 26 with an exterior surface having a relatively high coefficient of emission of radiant heat to promote heat transfer from the cover 26 to the refrigerant evaporator 14. For example, the receptacle 21 may be formed of sheet aluminum having a bright polished exterior surface, and the cover 26 may be formed of sheet iron having an enamel-coated exterior surface, or of sheet aluminum having an anodized exterior surface containing a black aniline dye. When the cover 26 is formed of sheet iron having an enamel-coated exterior surface, the color of the enamel is of no particular importance as far as the effect upon the emission coefficient of the exterior surface of the cover is concerned, as radiant heat is emitted equally well by all colors of enamel. It will be understood, of course, that this is true only of low frequency radiant heat emitted from relatively low temperature bodies as distinguished from high frequency solar radiation. All of the bodies present in the refrigerated compartment 11 including the side walls of the refrigerated compartment 11, the shelves 19 and 20, and articles supported on the shelves to be cooled have a temperature well within the range of relatively low temperature bodies referred to and emit only low frequency radiant heat. Furthermore, I have found that the color and the character of the interior surface of the receptacle 21 and the cover 26 are of very little practical importance as a film of moisture soon accumulates upon the interior surfaces of the receptacle 21 and the cover 26 when the receptacle 21 contains foods such as green vegetables, meats or the like and is placed in operation, which film of moisture produces an interior surface having a relatively high coefficient of absorption of radiant heat and, consequently, a relatively high coefficient of emission of radiant heat. In the particular construction shown in Figs. 1 to 5, inclusive, the receptacle 21 is formed of sheet aluminum having a bright polished exterior surface and the cover 27 is formed of sheet iron having an enamel-coated exterior surface.

I have found that an open top receptacle of this construction having a rectangular cross section of approximately 11" x 13½" and a depth of approximately 6" and a rectangular cover of this construction give excellent results when arranged in the refrigerated compartment of a household refrigerator below a refrigerant evaporator disposed therein and spaced approximately 1¼" from the lower wall of the refrigerant evaporator maintained at approximately a temperature of 20° F. With this arrangement a temperature of approximately 30° F. may be maintained readily in the interior of a receptacle in spite of the fact that the air circulated in the refrigerated compartment of the refrigerator is only approximately 40° F. and the temperature of the lower wall of the refrigerant evaporator spaced above the receptacle is only 20° F. Furthermore, I have found this arrangement to be satisfactory when employed in household refrigerators having refrigerated compartments ranging in volume from 6 to 16 cubic feet.

With a receptacle 21 and a removable cover 26 of the construction described and arranged within the refrigerated compartment 11 below and closely adjacent the refrigerant evaporator 14, a food storage atmosphere may be obtained readily in the interior of the receptacle 21 having a temperature of approximately 30° F. in spite of the fact that the air circulated in the refrigerated compartment 11 is only approximately 40° F. and the temperature of the lower wall of the refrigerant evaporator 14 disposed above the cover 26 and the receptacle 21 is only approximately 20° F.

In Fig. 6 I have shown a receptacle 21 of the construction of that described in connection with Figs. 2 and 3 provided with an invertible cover 40. The cover 40 is of rectangular configuration and is provided with a rolled marginal rim 41 thereabout which is adapted to rest upon the outwardly directed flange 24 provided on the marginal wall 23 about the upper portion thereof and arranged within the upwardly directed flange 25 about the outer margin of the outwardly directed flange 24 on the receptacle 21. Also, an outwardly extending knob 42 is secured to each side of the cover 40 by a threaded stud 43 engaging threaded openings formed in each of the knobs 42. One surface 40a of the cover 40 has a relatively high coefficient of emission of radiant heat and the other surface 40b of the cover 40 has a relatively low coefficient of emission of radiant heat. The cover 40 may be formed of sheet aluminum having an anodized surface 40a containing a black aniline dye and having a bright polished surface 40b.

When the receptacle 21 shown in Fig. 6 is placed in the refrigerated compartment 11 below and closely adjacent the refrigerant evaporator 14, the temperature of the storage atmosphere in the receptacle 21 is determined by the surface of the invertible cover 40 which is presented towards the refrigerant evaporator 14. When the cover 40 is placed upon the open top of the receptacle 21 with the surface 40a having a relatively high coefficient of emission of radiant heat presented toward the refrigerant evaporator 14, the storage atmosphere in the receptacle 21 assumes a relatively low temperature. On the other hand, when the cover 40 is placed upon the open top of the receptacle 21 with the surface 40b having a relatively low coefficient of emission of radiant heat presented toward the evaporator 14, the storage atmosphere in the receptacle 21 assumes a relatively high temperature. As previously explained in connection with the description of the construction and operation of the removable cover 27, shown in Figs. 2, 3, and 4, the surface of the cover 40 presented toward the interior of the receptacle 21 is of very little practical importance as a film of moisture soon accumulates thereon when the receptacle 21 contains foods such as green vegetables, meats or the like and is placed in operation, which film of moisture provides an interior surface having a relatively high coefficient absorption of radiant heat and, consequently, a relatively high coefficient of emission of radiant heat. The surface of the cover 40 presented toward the refrigerant evaporator 14 is swept by convection currents of air set up by the refrigerant evaporator 14 and maintained in a dry condition, so that the character of this surface may be utilized to determine the temperature of the storage atmosphere in the receptacle 21. Thus, the temperature of the storage atmosphere in the receptacle 21 may be selectively controlled by inverting the cover 40. When the surface 40a of the invertible cover 40 is presented toward the refrigerant evaporator 14 the temperature of the storage atmosphere in the receptacle 21 may be maintained readily at approximately 30° F. in spite of the fact that the air circulated in the refrigerated compartment 11 has a temperature of only approximately 40° F. and the temperature of the lower wall of the refrigerant evaporator 14 disposed above the cover 40 is only approximately 20° F. On the other hand, when the surface 40b of the invertible cover 40 is presented toward the refrigerant evaporator 14 the temperature of the storage atmosphere in the receptacle 21 may be maintained readily at approximately 36° F. in spite of the fact that the air circulated in the refrigerated compartment 11 has a temperature of approximately 40° F. and the temperature of the lower wall of the refrigerant evaporator 14 disposed above the cover 40 is approximately 20° F.

In Figs. 7 and 8 I have shown a food storage receptacle 50 and a removable cover 51 therefor of modified construction. The receptacle 50 comprises a substantially flat bottom wall and an upwardly directed marginal wall 52 having an outwardly extending and downwardly turned marginal rim 53 about the upper open top thereof. The removable cover 51 is provided with an outer downwardly opening marginal groove 54 therein supported upon the marginal rim 53 of the receptacle 50. An inner upwardly opening marginal groove or depression 55 is formed in the removable cover 51 adjacent the outer downwardly opening marginal groove 54 therein, the grooves 54 and 55 providing a construction having a section of substantially S-shape entirely about the margin of the cover 51. The cover 51 is also provided with a corrugated surface 56, the corrugations of the surface 56 extending transversely of the cover 51 and communicating with the sides of the inner upwardly opening marginal groove 55. A plurality of spaced-apart openings 57 are formed in the bottom of the inner upwardly opening marginal groove 55 and a reticulated rack 58 of the construction of that shown in Fig. 3 is arranged within the receptacle 50. The rack 58 is provided with food supporting wires providing a food supporting surface spaced above the bottom wall of the receptacle 50, and the marginal sides 58a of the rack 58 are spaced inwardly from the marginal wall 52 of the receptacle 50 and the openings 57 formed in the bottom of the inner upwardly opening groove 55. The receptacle 50 is otherwise constructed in a manner similar to the receptacle 21 shown in Figs. 1 to 3, inclusive, and is provided with an exterior surface having a relatively low coefficient of absorption of radiant heat. The exterior surface of the cover 51 is provided with an enamel coating as described in connection with the cover 26 shown in Figs. 1 to 5, inclusive.

The receptacle 50 together with its removable cover 51 supported in place on the marginal rim 53 of the receptacle 50 is positioned in the refrigerated compartment 11 of the refrigerator 10 below and closely adjacent the refrigerant evaporator 14. Upon defrosting of the refrigerant evaporator 14, drip water therefrom falls upon the cover 51 and is directed by the corrugated surface 56 thereof into the sides of the inner upwardly opening groove 55 from which it flows through the openings 57 into the interior of the receptacle 50. Due to the spacing of the marginal sides 58a of the rack 58 inwardly from the openings 57 formed in the bottom of the inner upwardly opening groove 55, the drip water from the evaporator 14 does not come in contact with the food supported by the supporting surface of the rack 58 and no contamination of the food results from defrosting of the refrigerant evaporator 14. Also, the spacing of the food supporting surface of the rack 58 above the bottom wall of the receptacle 50 is coordinated with respect to the area of the bottom wall to define a zone below the food supporting surface of the rack 58 which has a volume greater than the volume of the drip water from the refrigerant evaporator 14 incident to defrosting thereof. The corrugated surface 56 of the cover 51 not only serves to direct drip water from the refrigerant evaporator 14 into the interior of the receptacle 50 out of contact with food supported by the supporting surface of the rack 58, but it also substantially increases the ratio between the effective area of the cover 51 and the area of the open top of the receptacle 50. This construction is very advantageous in that an increased heat transfer by convection currents of air from the cover 51 to the refrigerant evaporator 14 is produced thereby which further reduces the temperature of the storage atmosphere in the receptacle 50. I have found that within reasonable limits the difference between the temperature of the storage atmosphere in the receptacle 50 and the temperature of the air circulated in the refrigerated compartment 11 is increased substantially in proportion to the increase in the effective area of the cover 51. For example, by substituting the cover 51 provided with the corrugated surface 56 having an effective area approximately 20 per cent greater than the area of the open top of the receptacle 50 for a substantially flat cover such as the cover 40 shown in Fig. 6, the temperature of the storage atmosphere in the receptacle 50 may be reduced readily from 30° F. to 28° F.

In Fig. 9 I have shown a modified form of removable cover 60 adapted to be used with the receptacle 50 shown in Figs. 7 and 8 and embodying an improved arrangement for increasing the effective area thereof. The cover 60 is provided with a corrugated surface 61 produced by a plurality of relatively wide and deep rectangular corrugations. A finned structure comprising a plurality of fins 62 secured to the upper surfaces of the corrugations of the corrugated surface 61 by line welding is provided on the exterior surface of the cover 60. The exterior surfaces of the cover 60 and the fins 62 are provided with an enamel coating, the cover 60 being constructed otherwise in a manner similar to the cover 51 shown in Figs. 7 and 8.

While I have shown a particular embodiment of my invention in connection with a household refrigerator, I do not desire my invention to be limited to the particular construction shown and described, and I intend in the appended claims to cover all modifications within the spirit and scope of my invention.

What I claim as new and desire to secure by Letters Patent of the United States, is:

1. In combination with a refrigerator provided with walls defining a compartment and having a cooling unit associated therewith, a food storage receptacle arranged in said compartment adjacent said cooling unit, the exterior surface of a substantial portion of said receptacle presented toward said cooling unit having a relatively high coefficient of emission of radiant heat to promote heat transfer from said receptacle to said cooling unit, the exterior surface of another substantial portion of said receptacle presented toward the walls of said compartment having a relatively low coefficient of absorption of radiant heat to impede heat transfer from the walls of said compartment and bodies therein to said receptacle.

2. In combination with a refrigerator provided with walls defining a compartment and having a cooling unit associated therewith, a food storage receptacle arranged in said compartment below said cooling unit and adjacent thereto, said receptacle having a bottom wall, an upwardly directed marginal wall and a top wall, the exterior surface of the bottom and marginal walls of said receptacle having a relatively low coefficient of absorption of radiant heat to impede heat transfer from the walls of said compartment and bodies therein to said receptacle, the exterior surface of the top wall of said receptacle having a relatively high coefficient of emission of radiant heat to promote heat transfer from said receptacle to said cooling unit.

3. In combination with a refrigerator including a compartment having a cooling unit associated therewith, a food storage receptacle arranged in said compartment below said cooling unit, said receptacle including a lower, open-topped member having a bottom wall and an upwardly directed marginal wall, a removable cover member supported by said receptacle, and a rack arranged within said receptacle and having a food supporting surface spaced above said bottom wall of said receptacle, said food supporting surface of said rack also being spaced inwardly from said marginal wall of said receptacle, one of said members being constructed to direct drip water from said cooling unit into the interior of said receptacle and between said food supporting surface of said rack and said marginal wall of said receptacle.

4. In combination with a refrigerator including a compartment having a cooling unit associated therewith, a food storage receptacle in said compartment, said receptacle having a bottom wall and an upwardly directed marginal wall, a removable cover supported by said receptacle, and a rack arranged within said receptacle and having a food supporting surface in spaced relationship with respect to said bottom and said marginal walls, said receptacle and said cover being so constructed and arranged in said compartment that drip water from said cooling unit is directed into the interior of said receptacle and between said food supporting surface of said rack and said marginal wall of said receptacle, the spacing of said food supporting surface of said rack above said bottom wall of said receptacle being coordinated with respect to the area of said bottom wall of said receptacle to define a zone below said food supporting surface of said rack having a volume greater than the normal volume of the drip water from said cooling unit incident to defrosting of said cooling unit.

5. In combination with a refrigerator including a compartment having a cooling unit associated therewith, a food storage receptacle in said compartment, said receptacle having a bottom wall and an upwardly directed marginal wall provided with an outwardly extending flange thereabout adjacent the upper portion thereof and an upwardly extending flange about the outer margin of said outwardly extending flange, a removable cover for said receptacle having a substantially flat surface and a downwardly directed marginal rim, and means including a pair of spaced apart handles carried by said cover for supporting said cover upon said receptacle with said marginal rim of said cover arranged within said upwardly extending flange of said receptacle and spaced a short distance from said outwardly extending flange of said receptacle, said receptacle and said cover being so positioned in said compartment that drip water from said cooling unit is directed by said cover onto said outwardly extending flange of said receptacle and thence into the interior of said receptacle, said cover being invertible for use as a serving tray.

6. In combination with a refrigerator including a compartment having a cooling unit associated therewith, a food storage receptacle in said compartment, said receptacle having a bottom wall and an upwardly directed marginal wall provided with an outwardly extending flange thereabout adjacent the upper portion thereof and an upwardly extending flange about the outer margin of said outwardly extending flange, a removable cover for said receptacle having a substantially flat surface and a downwardly directed marginal rim, and means including a pair of spaced apart handles carried by said cover and engaging said upwardly extending flange of said receptacle for supporting said cover upon said receptacle with said marginal rim of said cover arranged within and spaced from said upwardly extending flange of said receptacle and spaced a short distance from said outwardly extending flange of said receptacle, said receptacle and said cover being so positioned in said compartment that drip water from said cooling unit is directed by said cover onto said outwardly extending flange of said receptacle and thence into the interior of said receptacle, said cover being invertible for use as a serving tray.

7. A receptacle for the storage of food in a refrigerator having a bottom wall and an upwardly directed marginal wall provided with an outwardly extending flange thereabout adjacent the upper portion thereof and an upwardly extending flange about the outer margin of said outwardly extending flange, a removable cover for said receptacle having a substantially flat surface and a downwardly directed marginal rim, and means including a pair of spaced apart handles carried by said cover for supporting said cover upon said receptacle with said marginal rim of said cover arranged within said upwardly extending flange of said receptacle and spaced a short distance from said outwardly extending flange of said receptacle, said cover being invertible for use as a serving tray.

8. In combination with a refrigerator provided with walls defining a compartment and having a cooling unit associated therewith, a food storage receptacle arranged in said compartment below said cooling unit and adjacent thereto, said receptacle having a bottom wall and an upwardly directed marginal wall provided with an outwardly extending flange thereabout adjacent the upper portion thereof and an upwardly extending flange about the outer margin of said outwardly extending flange, a removable cover for said receptacle having a substantially flat surface and a downwardly directed marginal rim, and means including a pair of spaced apart handles carried by said cover for supporting said cover upon said receptacle with said marginal rim of said cover arranged within said upwardly extending flange of said receptacle and spaced a short distance from said outwardly extending flange of said receptacle, the exterior surface of said receptacle having a relatively low coefficient of absorption of radiant heat to impede heat transfer from the walls of said compartment and bodies therein to said receptacle, the exterior surface of said cover having a relatively high coefficient of emission of radiant heat to promote heat transfer from said cover to said cooling unit, said cover being invertible for use as a serving tray.

9. In combination with a refrigerator including a compartment having a cooling unit associated therewith, a food storage receptacle arranged in said compartment adjacent said cooling unit, said receptacle having a bottom wall and an upwardly directed marginal wall providing an open top, and a removable cover for the open top of said receptacle, and means to provide a substantially increased heat transfer by convection currents of air from said cover to said cooling unit, said means including corrugations for increasing the effective area of said cover to a value substantially greater than the area of the open top of said receptacle.

10. In combination with a refrigerator including a compartment having a cooling unit associated therewith, a food storage receptacle arranged in said compartment adjacent said cooling unit, said receptacle having a bottom wall and an upwardly directed marginal wall providing an open top, a removable cover for the open top of said receptacle, and means to provide a substantially increased heat transfer by convection currents of air from said cover to said cooling unit, said means including a fin structure carried by said cover for increasing the effective area of said cover to a value substantially greater than the area of the open top of said receptacle.

11. In combination with a refrigerator provided with walls defining a compartment and having a cooling unit associated therewith, a food storage receptacle arranged in said compartment below said cooling unit and adjacent thereto, said receptacle having a bottom wall and an upwardly directed marginal wall providing an open top, and a removable cover for the open top of said receptacle, the exterior surface of said receptacle having a relatively low coefficient of absorption of radiant heat to impede heat transfer from the walls of said compartment and bodies therein to said receptacle, said cover having an effective area substantially greater than the area of the open top of said receptacle to provide an increased heat transfer by convection currents of air from said cover to said cooling unit, the exterior surface of said cover having a relatively high coefficient of emission of radiant heat to promote heat transfer from said cover to said cooling unit.

12. In combination with a refrigerator including a compartment having a cooling unit associated therewith, a food storage receptacle in said compartment, said receptacle having a bottom wall and an upwardly directed marginal wall, a removable cover for said receptacle having a depression therein and a marginal rim thereabout supported on the upper portion of said marginal wall of said receptacle, and a rack arranged within said receptacle and having a food supporting surface spaced above said bottom wall of said receptacle, said food supporting surface of said rack also being spaced inwardly from said marginal wall of said receptacle, said receptacle and said cover being so positioned in said compartment that drip water from said cooling unit is directed into said depression in said cover, said depression in said cover having an opening therein arranged to afford a passage for the flow of drip water into the interior of said receptacle and between said food supporting surface of said rack and said marginal wall of said receptacle.

13. In combination with a refrigerator including a compartment having a cooling unit associated therewith, a food storage receptacle in said compartment, said receptacle having a bottom wall and an upwardly directed marginal wall, a removable cover for said receptacle having an upwardly opening marginal groove therein and a marginal rim thereabout supported on the upper portion of said marginal wall of said receptacle, and a rack arranged within said receptacle having a food supporting surface spaced above said bottom wall of said receptacle, said food supporting surface of said rack also being spaced inwardly from said marginal wall of said receptacle, said receptacle and said cover being so positioned in said compartment that drip water from said cooling unit is directed into said upwardly opening marginal groove in said cover, said upwardly opening marginal groove in said cover having an opening therein arranged to afford a passage for the flow of drip water into the interior of said receptacle and between said food supporting surface of said rack and said marginal wall of said receptacle.

14. In combination with a refrigerator including a compartment having a cooling unit associated therewith, a food storage receptacle in said compartment, said receptacle having a bottom wall and an upwardly directed marginal wall, a removable cover for said receptacle having a corrugated surface and an inner upwardly opening marginal groove thereabout and an outer marginal rim supported on the upper portion of said marginal wall of said receptacle, and a rack arranged within said receptacle having a food supporting surface in spaced relationship with respect to said bottom and said marginal walls, said receptacle and said cover being so positioned in said compartment that drip water from said cooling unit is directed by said corrugated field of said cover into said upwardly opening marginal groove therein, said upwardly opening marginal groove in said cover having an opening therein arranged to afford a passage for the flow of drip water into the interior of said receptacle and between said food supporting surface of said rack and said marginal wall of said receptacle.

15. In combination with a refrigerator including a compartment having a cooling unit associated therewith, a food storage receptacle arranged in said compartment below said cooling unit and adjacent thereto, said receptacle having a bottom wall and an upwardly directed marginal wall providing an open top, an invertible cover for the open top of said receptacle, said cover being arranged for selectively controlling the temperature of the interior of said receptacle by inverting said cover.

16. In combination with a refrigerator including a compartment having a cooling unit associated therewith, a food storage receptacle arranged in said compartment below said cooling unit and adjacent thereto, said receptacle having a bottom wall and an upwardly directed marginal wall providing an open top, and means including an invertible cover for the open top of said receptacle for selectively controlling the temperature of the interior of said receptacle, one surface of said cover having a relatively high coefficient of emission of radiant heat and the other surface of said cover having a relatively low coefficient of emission of radiant heat.

17. In combination with a refrigerator provided with walls defining a compartment and having a cooling unit associated therewith, a food storage receptacle arranged in said compartment below said cooling unit and adjacent thereto, said receptacle having a bottom wall and an upwardly directed marginal wall providing an open top, and means including an invertible cover for the open top of said receptacle for selectively controlling the temperature of the interior of said receptacle, the exterior surface of said receptacle having a relatively low coefficient of absorption of radiant heat to impede heat transfer from the walls of said compartment and bodies therein to said receptacle, one surface of said cover having a relatively high coefficient of emission of radiant heat and the other surface of said cover having a relatively low coefficient of emission of radiant heat.

18. In combination with a refrigerator including a compartment having a cooling unit associated therewith, a food storage receptacle arranged in said compartment below said cooling unit, said receptacle including a lower, open-topped member having a bottom wall and an upwardly directed marginal wall, a removable cover member supported by said receptacle, and food supporting means within said receptacle and spaced above said bottom wall of said receptacle, said food supporting means also being spaced inwardly from said marginal wall of said receptacle, one of said members being constructed to direct drip water from said cooling unit into the interior of said receptacle and between said food supporting means and said marginal wall of said receptacle.

JAMES L. FLETCHER.